United States Patent
Chi et al.

(10) Patent No.: US 11,648,667 B2
(45) Date of Patent: May 16, 2023

(54) PROCESSING PATH GENERATING DEVICE AND METHOD THEREOF

(71) Applicant: INDUSTRIAL TECHNOLOGY RESEARCH INSTITUTE, Hsinchu (TW)

(72) Inventors: Tien-Yun Chi, Taichung (TW); Cheng-Han Tsai, Hsinchu (TW); Kuo-Feng Hung, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 258 days.

(21) Appl. No.: 16/704,769

(22) Filed: Dec. 5, 2019

(65) Prior Publication Data

US 2021/0154834 A1    May 27, 2021

(30) Foreign Application Priority Data

Nov. 21, 2019   (TW) .................................. 108142343

(51) Int. Cl.
     *B25J 9/16*          (2006.01)

(52) U.S. Cl.
     CPC ............. *B25J 9/1664* (2013.01); *B25J 9/163* (2013.01); *B25J 9/1671* (2013.01); *B25J 9/1692* (2013.01)

(58) Field of Classification Search
     CPC ........ B25J 9/1664; B25J 9/163; B25J 9/1692; B25J 9/1671; B25J 9/1602; G05B 19/423; G05B 2219/39137
See application file for complete search history.

(56) References Cited

U.S. PATENT DOCUMENTS

| | | | |
|---|---|---|---|
| 6,763,284 B2 | 7/2004 | Watanabe et al. | |
| 8,824,777 B2 | 9/2014 | Choi et al. | |
| 9,694,495 B1* | 7/2017 | Edsinger | G05B 19/423 |
| 9,919,422 B1* | 3/2018 | Horton | G05B 19/423 |

(Continued)

FOREIGN PATENT DOCUMENTS

| | | |
|---|---|---|
| CN | 107972029 A | 5/2018 |
| CN | 108214495 A | 6/2018 |

(Continued)

OTHER PUBLICATIONS

Chen et al., "Development of a Virtual Teaching Pendant System for Serial Robots based on ROS-I," IEEE 8th Conference on CIS & RAM, Ningbo, China, 2017, pp. 720-724.

(Continued)

*Primary Examiner* — Jeff A Burke
*Assistant Examiner* — Joshua Alexander Garza
(74) *Attorney, Agent, or Firm* — Birch, Stewart, Kolasch & Birch, LLP

(57) ABSTRACT

A processing path generating device including an intuitive path teaching device and a controller is provided. The intuitive path teaching device is provided for gripping and moving with respect to a workpiece to create a moving path. The intuitive path teaching device has a detecting portion for detecting a surface feature of the workpiece. The controller is connected to the intuitive path teaching device. The controller generates a processing path according to the moving path of the intuitive path teaching device and the surface feature of the workpiece.

15 Claims, 3 Drawing Sheets

(56) References Cited

U.S. PATENT DOCUMENTS

| | | | |
|---|---|---|---|
| 10,759,051 B2* | 9/2020 | Tan | B25J 9/162 |
| 2011/0087375 A1 | 4/2011 | Aurnhammer et al. | |
| 2015/0323398 A1* | 11/2015 | Lauzier | B25J 9/0081 73/862.08 |
| 2017/0364076 A1* | 12/2017 | Keshmiri | G05B 19/0426 |
| 2018/0101166 A1* | 4/2018 | Aldridge | B25J 9/1671 |
| 2018/0281173 A1 | 10/2018 | Hane et al. | |
| 2019/0054617 A1* | 2/2019 | Huang | B29C 65/52 |
| 2019/0086907 A1* | 3/2019 | Oestergaard | B25J 9/1615 |
| 2019/0321983 A1* | 10/2019 | Chen | B25J 9/1656 |
| 2020/0061819 A1* | 2/2020 | Ooga | G05B 19/0421 |
| 2020/0338730 A1* | 10/2020 | Yamauchi | B25J 9/1605 |
| 2021/0001484 A1* | 1/2021 | Bogart | B25J 9/08 |
| 2022/0063098 A1* | 3/2022 | Aldridge | B25J 9/161 |

FOREIGN PATENT DOCUMENTS

| | | |
|---|---|---|
| CN | 108290286 A | 7/2018 |
| CN | 108687747 A | 10/2018 |
| CN | 109087343 A | 12/2018 |
| CN | 110170995 A | 8/2019 |
| CN | 110385694 A | 10/2019 |
| TW | 200602829 A | 1/2006 |
| TW | M483850 U | 8/2014 |
| TW | 201632328 A | 9/2016 |
| TW | 201737002 A | 10/2017 |
| TW | 201738676 A | 11/2017 |
| TW | 201805127 A | 2/2018 |
| TW | 201928553 A | 7/2019 |
| TW | 201941886 A | 11/2019 |
| WO | WO 91/04521 A1 | 4/1991 |

OTHER PUBLICATIONS

Choi et al., "Feature Point Recognition for the Direct Teaching Data in Industrial Robot," 8th International Conference on Ubiquitous Robots and Ambient Intelligence (URAI), Songdo ConventiA, Incheon, Korea, Nov. 23-26, 2011, pp. 780-781.

Choi et al., "Teaching Data Extraction for the Direct Teaching in Industrial Robot," 8th International Conference on Ubiquitous Robots and Ambient Intelligence (URAI), Songdo ConventiA, Incheon, Korea, Nov. 23-26, 2011, pp. 830-831.

Do et al., "User-friendly Teaching Tool for a Robot Manipulator in Human Robot Collaboration," 14th International Conference on Ubiquitous Robots and Ambient Intelligence (URAI), Maison Glad Jeju, Jeju, Korea, Jun. 28-Jul. 1, 2017, pp. 751-752.

Le et al., "Graphical Simulator for Teaching Robot with Parallel Wire Type Teaching Device," 3rd International Conference on Control, Automation and Robotics, 2017, pp. 233-236.

Tatsuno et al., "Human Friendly Teaching for Industrial Robots," IEEE International Workshop on Robot and Human Communication, 1996, pp. 456-460.

Chinese Office Action and Search Report for Chinese Application No. 202010007859.0, dated Dec. 13, 2021.

\* cited by examiner

PROCESSING PATH GENERATING DEVICE AND METHOD THEREOF

This application claims the benefit of Taiwan application Serial No. 108142343, filed Nov. 21, 2019, the disclosure of which is incorporated by reference herein in its entirety.

TECHNICAL FIELD

The disclosure relates in general to a path generating device, and more particularly to a processing path generating device and a method thereof.

BACKGROUND

Nowadays industrial robots are normally provided with a teaching device, which teaches a robotic arm to perform various actions, records the operating tracks of the robotic arm and repeats the taught paths, such that the robotic arm can complete many tasks of automation. When the teaching device is used to generate a processing path, the robotic arm needs to move to a fixed point according to the stored work coordinates, and the work coordinates need to be reset when the path needs to be modified. Such method not only consumes a large amount of time and involves complicated operations, but also generates many obstacles. Besides, in response to modern industrial production, which is small in amount but large in variety, it has become a prominent task for the industries to perform a quick and reliable path teaching to generate a processing path.

SUMMARY

The disclosure is directed to a device and a method for generating a processing path. The work coordinates on a moving path are collected and recorded by an intuitive path teaching device. Then, the moving path of the path teaching device is transmitted to a controller of a robotic arm and used as a processing path of the robotic arm. The processing path of the robotic arm is further optimized through the simulation analysis of the moving path.

According to one embodiment of the present disclosure, a processing path generating device including an intuitive path teaching device and a controller is provided. The intuitive path teaching device is provided for gripping and moving with respect to a workpiece to create a moving path. The intuitive path teaching device is used for detecting a surface feature of the workpiece. The controller is connected to the intuitive path teaching device. The controller generates a processing path according to the moving path of the intuitive path teaching device and the surface feature of the workpiece.

According to another embodiment of the present disclosure, a processing path generating method is provided. The generating method includes the following steps; collecting and recording a moving path of an intuitive path teaching device; detecting a surface feature of a workpiece; and generating a processing path according to the moving path of the intuitive path teaching device and the surface feature of the workpiece.

The above and other aspects of the disclosure will become understood with regard to the following detailed description of the embodiment(s). The following description is made with reference to the accompanying drawings.

Figure 1:
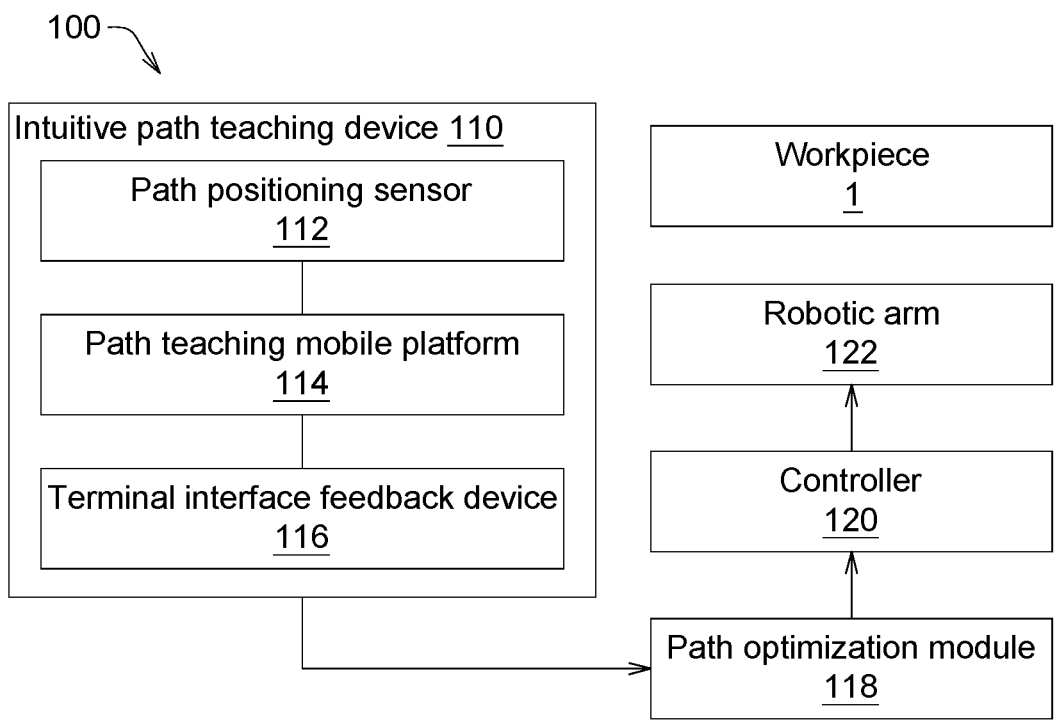
FIG. 1 is a schematic diagram of a path generating device according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Detailed descriptions of the present disclosure are disclosed below with a number of embodiments. However, the disclosed embodiments are for explanatory and exemplary purposes only, not for limiting the scope of protection of the disclosure. Similar/identical designations are used to indicate similar/identical elements. Directional terms such as above, under, left, right, front or back are used in the following embodiments to indicate the directions of the accompanying drawings, not for limiting the present disclosure.

According to an embodiment of the present disclosure, a processing path generating device, including such as an intuitive path teaching device, is provided. The intuitive path teaching device, which can be gripped and moved by a user, includes a path positioning sensor configured to collect and record the work coordinates of a moving path and a distance relative to the workpiece and detect the surface feature of the workpiece.

In an embodiment, the path positioning sensor includes a space coordinates capturing module configured to obtain a two-dimensional (2D) image or a three-dimensional (3D) space point cloud data containing depth information for creating the coordinates of the workpiece in a 3D space. Besides, the path positioning sensor includes a feature capturing module configured to capture a surface feature of the workpiece used in subsequent feature comparison.

Referring to FIG. 1, a schematic diagram of a path generating device 100 according to an embodiment of the present disclosure is shown. The processing path generating device 100 includes an intuitive path teaching device 110 and a controller 120. The intuitive path teaching device 110 is provided for gripping and moving with respect to a workpiece 1 to create a moving path. The intuitive path teaching device 110 is used for detecting a surface feature of the workpiece 1. The controller 120 is connected to the intuitive path teaching device 110 for generating a processing path according to the moving path of the intuitive path teaching device 110 and the surface feature of the workpiece 1.

Moreover, the processing path generating device 100 may further include a robotic arm 122 connected to the controller 120, and the controller 120 drives the robotic arm according to the processing path 122 to process the workpiece 1.

In an embodiment, the intuitive path teaching device 110 includes a path positioning sensor 112, a path teaching mobile platform 114 and a terminal interface feedback device 116.

The path positioning sensor 112 is configured to collect and record the work coordinates on a moving path and a distance (or posture) relative to the workpiece 1. In an embodiment, the path positioning sensor 112 is configured to provide posture sensing relative to the workpiece 1 and capture the feature of the workpiece 1 through depth image and 2D image.

The path teaching mobile platform 114 is provided for supporting and moving the path positioning sensor 112. In an embodiment, the user can hold and manually move the path teaching mobile platform 114 (such as by the handle 108 of FIG. 3). The path teaching mobile platform 114 can have a housing of any shape (such as a cuboid or a cylinder), and the appearance of the housing can be correspondingly changed to match the appearance of the robotic arm 122. Moreover, the housing of the mobile platform 114 can be replaceable, and the shape of the housing adopted by the user can correspond to the robotic arm, which actually processes the workpiece, such that obstacle avoidance space required by the robotic arm 122 can be approximated during path teaching.

Figure 3:
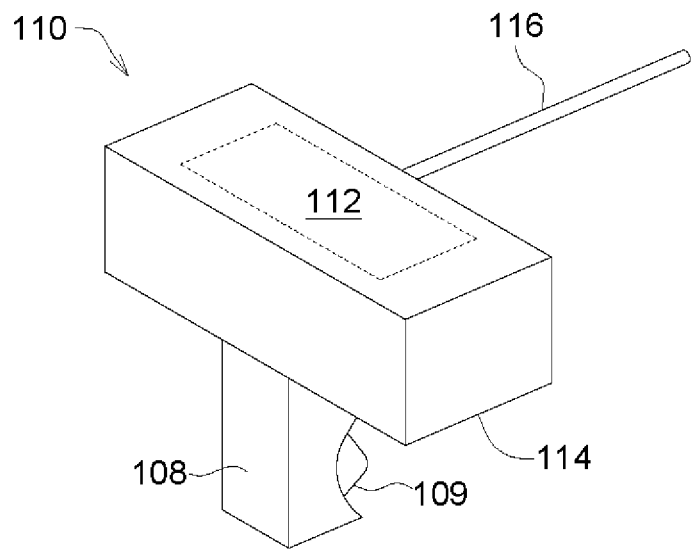
FIG. 3 is a schematic diagram of a path generating device according to an embodiment of the present disclosure.

Refer to FIG. 3. In an embodiment, the path teaching mobile platform 114 may include a handle 108 and a button 109. When the user activates the button 109, the path positioning sensor 112 is activated and starts to collect and record a moving path of the intuitive path teaching device 110. After the button 109 is pressed for a period of time, the path positioning sensor 112 can capture the surface feature of the workpiece 1 to perform posture sensing relative to the workpiece 1. After the button 109 is released, the path positioning sensor 112 automatically stores the position information of one set of moving path in the storage unit. If the position information of the next set of moving path needs to be recorded, the user only needs to activate the button 109 again. In the present embodiment, the start and the end of path recording can also be controlled through the user of network, voice control or a force feedback signal in addition to the use of the button 109. For example, the operator can operate the computer to send a control command for recording the path through network communication. Or, the operator can control path recording by a voice control. Or, the operator can control the start and the end of path recording by a contact force feedback signal through a terminal interface. In an embodiment, the above network and voice control for path recording may include the following control commands, such as start recording, finish recording, pause recording, abandon the current recording, re-start recording, repeat the same path recording, and optimize the path, but the present disclosure is not limited thereto.

Therefore, the intuitive path teaching device 110 can repeat path teaching for several times to create a plurality of moving paths. After path teaching is repeated for several times, the user can smooth the moving path to reduce the error of path teaching.

Besides, the terminal interface feedback device 116 is disposed on the path teaching mobile platform 114 for outputting a terminal sensing signal to the path positioning sensor 112. The terminal interface feedback device 116 has at least one of the elements, such as probe, clamper, cutter, spray gun, force sensor, drill, screw locking gun, welding torch, and laser light source. The controller 120 generate a processing path according to the recorded moving path, the surface feature of the workpiece 1 and the terminal sensing signal. In an illustrative rather than a restrictive embodiment, the probe is configured to measure the surface contour of a 3D workpiece; the clamper is configured to pick and place the workpiece; the cutter is configured to perform a cutting process; the spray gun is configured to perform a spraying process; the force sensor and the drill are configured to perform a drilling process; the force sensor and the screw locking gun are configured to perform a screw locking process; the force sensor and the clamper are configured to perform a workpiece gripping and placing process. With the force sensor, the operator can perform a more dedicate picking and placing action (for example, the workpiece is very small). The force sensor and the cutter are configured to perform a cutting process. With the force sensor, the operator can perform a more dedicate machining action (such as precision machining). The force sensor and the welding torch are configured to perform a welding process. The laser light source is configured to perform a laser cutting process, a glue spraying process or a welding process.

In an embodiment, the terminal interface feedback device 116, such as a contact sensor or a non-contact sensor, is configured to provide a terminal feedback generated when the user performs path teaching. The contact sensing, which includes pressure sensing, gripping sensing and tactile sensing, simulates the machining of the robotic arm 122. The non-contact sensing, which includes optical sensing, ultrasound sensing or image sensing, can be combined with a virtual reality software (optional) to simulate whether there are any obstacles around the robotic arm 122 and define a safe operating range of the robotic arm 122. Moreover, the non-contact sensor can have a mist generating device (optional) disposed on the path teaching mobile platform 114. The mist generating device can spray a temporary surface developer or modifier on the workpiece 1 to simulate the actual working state of the workpiece 1.

In an embodiment, the controller 120 inputs the position coordinates of the processing path to the robotic arm 122 and causes the robotic arm 122 to move according to the received position coordinates and perform a machining process on the workpiece 1. Examples of the machining process include spraying process, grinding process, laser cutting process, and picking and assembling process.

In the present embodiment, the intuitive path teaching device 110 is adopted. The intuitive path teaching device 110 can be held and moved to provide the controller 120 with necessary movement information for generating a processing path without moving the robotic arm 122. With the position coordinates provided by the controller 120, the robotic arm 122 does not need to be moved to a fixed point, too.

Refer to FIG. 1 again. The processing path generating device 100 may include a path optimization module 118 (optional), which receives the moving path transmitted from the path positioning sensor 112, performs simulation analysis on the moving path and stores the optimized moving path in the controller 120.

In the present embodiment, the path optimization module 118 (optional) can be realized by a simulation analysis module, which can be independently interposed between the intuitive path teaching device 110 and the controller 120, in-built in the intuitive path teaching device 110, or disposed on the controller 120, and the present disclosure does not have specific restrictions regarding the said arrangement. In an embodiment, the path optimization module 118 can be performed by a simulation analysis software, virtual reality software or other application programs in-built in the storage unit of the intuitive path teaching device 110 or the controller 120 for generating a virtual working environment and collision parameters. After simulation analysis is performed, the optimized moving path is stored in the controller 120.

Figure 2:
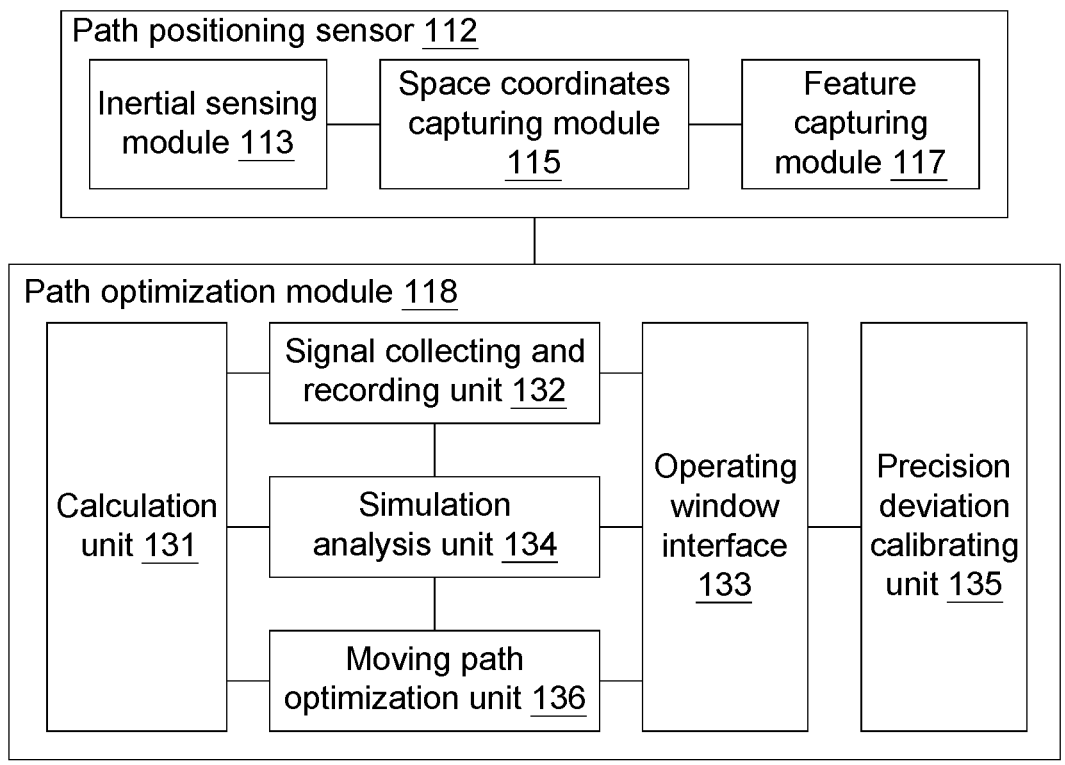
FIG. 2 is an interior schematic diagram of a path positioning sensor and a path optimization module configured to perform simulation analysis according to an embodiment of the present disclosure.

Referring to FIG. 2, an interior schematic diagram of a path positioning sensor 112 and a path optimization module 118 configured to perform simulation analysis according to an embodiment of the present disclosure is shown. The path positioning sensor 112 includes at least one of an inertial sensing module 113, a space coordinates capturing module 115 and a feature capturing module 117. The path optimization module 118 may include a calculation unit 131, an operating window interface 133 and a precision deviation calibrating unit 135. In FIG. 2, the signal collecting and recording unit 132 is configured to store the position information of the moving path of the intuitive path teaching device 110; the simulation analysis unit 134 is configured to receive the position information of the intuitive path teaching device 110 performing path teaching and the terminal sensing signal for simulating actual machining performed on the workpiece 1 by the robotic arm 122; the moving path optimization unit 136 is configured to smooth the moving path to reduce the error of path teaching. The signal collecting and recording unit 132, the simulation analysis unit 134 and the moving path optimization unit 136 disclosed above can be multiplexed by the calculation unit 131 (such as a processor) or performed by corresponding function modules respectively, and the present disclosure does not have specific restrictions regarding the said arrangement.

In an embodiment, the inertial sensing module 113 can be formed of a multi-axis acceleration gauge or a G-sensor. Acceleration vectors can be measured by individual acceleration gauge. Then, the acceleration vectors are further pre-treated and filtered by a signal processing unit, and then are transmitted to the calculation unit 131, which calculates the strength of the acceleration vector of each axis.

The space coordinates capturing module 115, such as an optical radar (LIDAR) module or a 3D optical scanning module, can capture the 3D space point cloud data to obtain the space coordinates of the workpiece 1 by using time-of-flight or triangulation technology. In another embodiment, the space coordinates capturing module 115 or the feature capturing module 117 can capture the features of the workpiece 1 through 2D image and depth image and enhance the posture positioning effect through feature comparison. Feature comparison is based on the calculation of the data of characteristic vectors. The data of characteristic vectors can be obtained from the characteristic values, such as the mean, standard deviation, and absolute summation of segmental data calculated by the calculation unit 131 (such as a processor). The data of characteristic vectors can be used to construct a complete posture model, which is stored in a database and used as a reference for subsequent posture recognition and positioning process.

Refer to FIG. 2. After the calculation unit 131 obtains the information of the moving path, a simulation analysis (or virtual-real integration analysis) can be performed on the moving path. The simulation analysis includes collision analysis, path smoothness analysis, limit analysis, singularity analysis and precision analysis, and the present disclosure is not limited thereto. The said simulation analysis can be performed by a computer or a simulator, and the simulation result is transmitted to the controller 120 through wired or wireless transmission. Additionally, the path optimization module 118 has an operating window interface 133, through which the parameters of simulation analysis, such as path smoothness, path limit, speed limit, precision value, and precision deviation, are set. The simulation result can further be displayed on the operating window interface 133 for the user to view. Besides, the path optimization module 118 includes a precision deviation calibrating unit 135, which modifies the track of the moving path to reduce the precision deviation of the processing path if the moving path does not match the predetermined precision parameter (refer to the moving path T of FIG. 4A and the optimized moving path S of FIG. 4B).

The above simulation analysis can be repeated for several times to optimize the track of the moving path (for example, performed by the moving path optimization unit 136 of FIG. 2) and the optimized moving path is stored in the controller 120. Then, the controller 120 inputs the optimized moving path to the robotic arm 122 and converts the 3D space coordinates system into the coordinates system of the robotic arm 122 for generating a processing path of the robotic arm 122. Or, the controller 120 performs actual test to verify the simulation result.

In an embodiment, the work mode of signal capturing and path optimization can be divided into two types: According to one work mode, the inertial sensing module 113, the space coordinates capturing module 115, the feature capturing module 117 and the path optimization module 118 synchronically capture and analyze signals (that is, perform synchronous analysis and instant optimization at the same time). According to the other work mode, captured signals are analyzed and optimized (that is, precision analysis) only after the entire moving path is completed, but the present disclosure is not limited thereto. The above synchronous analysis and instant optimization may include at least one of collision analysis, smoothness analysis, limit analysis, and singularity analysis. After the entire path is completed, each of the above analysis and the path optimization (i.e., precision analysis) can be performed.

Figure 4A:
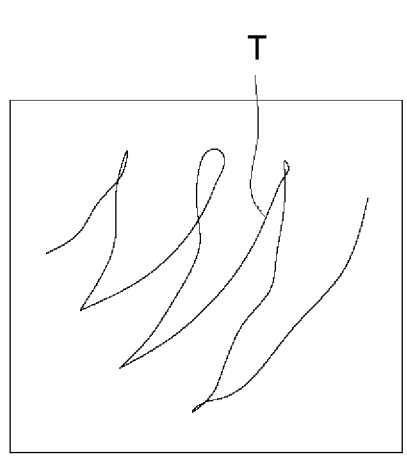
FIG. 4A and FIG. 4B respectively are a schematic diagram of an original moving path and a schematic diagram of an optimized moving path.
Figure 4B:
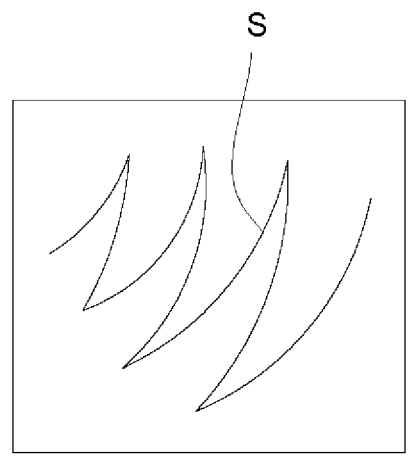

Refer to FIG. 4A and FIG. 4B. The simulation analysis unit 134 simulates each linkage action of the robotic arm 122 and the housing of the workpiece 1 to perform collision analysis, and analyzes the singularities, limits and path smoothness to optimize the moving path according to the mathematical model and the moving track of the robotic arm 122. A comparison between the original moving path T and the optimized moving path S shows that the optimized moving path S removes noises and overlapping path, and at the same time resolves the problems of smoothness, limits and singularities.

Figure 5:
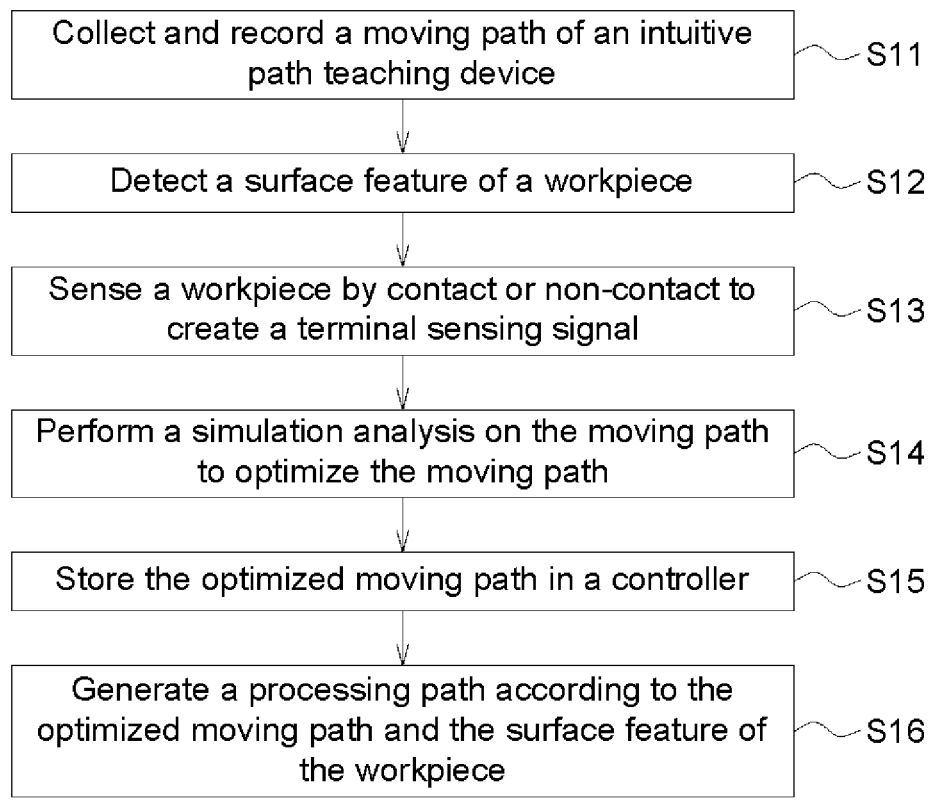
FIG. 5 is a flowchart of a processing path generating method according to an embodiment of the present disclosure.

Refer to FIG. 1 and FIG. 5. FIG. 5 is a flowchart of a processing path generating method according to an embodiment of the present disclosure. The processing path generating method includes steps S11-S16. However, some of steps S11-S16 can be omitted. In step S11, a moving path of an intuitive path teaching device 110 is collected and recorded. In step S12, a surface feature of a workpiece 1 is detected and the surface feature of the workpiece is captured through optical radar, 3D optical scanning, 2D image or depth image. In step S13, a workpiece 1 is sensed by contact or non-contact to create a terminal sensing signal. In step S14, a simulation analysis is performed on the moving path to optimize the moving path. In step S15, the optimized moving path is stored in the controller 120. In step S16, a processing path is generated by the controller 120 according to the optimized moving path and the surface feature of the workpiece 1. Then, the processing path is inputted to a robotic arm 122 by the controller 120 for moving the robotic arm 122 to process the workpiece 1.

According to the processing path generating device and method disclosed in above embodiments of the present disclosure, the work coordinates on a moving path are collected and recorded by an intuitive path teaching device, the moving path of the path teaching device is transmitted to the controller of the robotic arm and used as a processing path of the robotic arm, and the processing path of the robotic arm is further optimized through the simulation analysis of the moving path.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A processing path generating device, comprising:
an intuitive path teaching device provided for gripping and moving with respect to a workpiece to create a plurality of moving paths for several times for a controller with movement information of the intuitive path teaching device, such that the controller obtains the plurality of moving paths without moving a robotic arm, wherein the intuitive path teaching device is used for detecting a surface feature of the workpiece, wherein the intuitive path teaching device comprises:
a path positioning sensor configured to collect and record work coordinates of the plurality of moving paths and a distance of the path positioning sensor relative to the workpiece; and
a terminal interface feedback device for outputting a terminal sensing signal to the path positioning sensor;
the controller connected to the intuitive path teaching device for generating a processing path according to the plurality of moving paths of the intuitive path teaching device, the surface feature of the workpiece and the terminal sensing signal outputted by the terminal interface feedback device;
a path optimization module for receiving the plurality of moving paths, performing a simulation analysis on the plurality of moving paths, wherein the simulation analysis comprises collision analysis, path smoothness analysis, limit analysis, singularity analysis and precision analysis, and storing an optimized moving path in the controller, wherein the path optimization module comprises:
a precision deviation calibrating unit for modifying the optimized moving path by repeatedly iterated through each of intuitive path teachings to reduce precision deviation of the processing path.

2. The generating device according to claim 1, wherein the intuitive path teaching device comprises:
a path teaching mobile platform configured to carry and move the path positioning sensor, and the terminal interface feedback device is disposed on the path teaching mobile platform.

3. The generating device according to claim 2, wherein the path optimization module further comprises:
a calculation unit configured to obtain a position information of the moving path and analyze the moving path;
a signal collecting and recording unit configured to store the position information of the moving path; and
a simulation analysis unit configured to receive the position information of the moving path and the terminal sensing signal.

4. The generating device according to claim 2, wherein the terminal interface feedback device senses the workpiece by contact to create the terminal sensing signal.

5. The generating device according to claim 2, wherein the terminal interface feedback device senses the workpiece by non-contact to create the terminal sensing signal.

6. The generating device according to claim 1, wherein the path positioning sensor comprises at least one of an inertial sensing module, a space coordinates capturing module and a feature capturing module.

7. The generating device according to claim 1, further comprising the robotic arm connected to the controller, wherein the controller drives the robotic arm according to the processing path to process the workpiece.

8. A processing path generating method, comprising:
collecting and recording a plurality of moving paths of an intuitive path teaching device for several times for a controller with movement information of the intuitive path teaching device, such that the controller obtains the plurality of moving paths without moving a robotic arm, wherein the intuitive path teaching device comprises a path positioning sensor configured to collect and record work coordinates of the plurality of moving paths and a distance of the path positioning sensor relative to a workpiece; and a terminal interface feedback device for outputting a terminal sensing signal to the path positioning sensor;
detecting a surface feature of the workpiece by the terminal interface feedback device; and
generating a processing path according to the plurality of moving paths of the intuitive path teaching device, the surface feature of the workpiece and the terminal sensing signal outputted by the terminal interface feedback device,
wherein the method further comprises:
performing a simulation analysis on the plurality of moving paths and storing an optimized moving path in the controller, wherein the simulation analysis comprises collision analysis, path smoothness analysis, limit analysis, singularity analysis and precision analysis; and
performing a precision deviation calibrating step for modifying the optimized moving path by repeatedly iterated through each of intuitive path teachings to reduce precision deviation of the processing path.

9. The generating method according to claim 8, further comprising sensing the workpiece by contact or non-contact to create the terminal sensing signal.

10. The generating method according to claim 9, wherein sensing by contact comprises pressure sensing, gripping sensing or tactile sensing.

11. The generating method according to claim 9, wherein sensing by non-contact comprises optical sensing, ultrasound sensing or image sensing.

12. The generating method according to claim 8, wherein detecting the surface feature of the workpiece comprises capturing the surface feature of the workpiece through optical radar, 3D optical scanning, 2D image or depth image.

13. The generating method according to claim 8, further comprising generating the processing path according to the optimized moving path and the surface feature of the workpiece.

14. The generating method according to claim 13, further comprising inputting the processing path to the robotic arm for moving the robotic arm to process the workpiece.

15. The generating method according to claim 8, further comprising inputting the processing path to the robotic arm for moving the robotic arm to process the workpiece.

* * * * *